United States Patent
Lyons et al.

(10) Patent No.: US 10,082,319 B2
(45) Date of Patent: Sep. 25, 2018

(54) JOULE THOMSON AIDED STIRLING CYCLE COOLER

(71) Applicant: RAYTHEON COMPANY, Waltham, MA (US)

(72) Inventors: Paul M. Lyons, Tucson, AZ (US); Daniel W. Brunton, Tucson, AZ (US); Jon E. Leigh, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 273 days.

(21) Appl. No.: 14/884,348

(22) Filed: Oct. 15, 2015

(65) Prior Publication Data

US 2017/0108248 A1    Apr. 20, 2017

(51) Int. Cl.
| | |
|---|---|
| F25B 21/00 | (2006.01) |
| F25B 9/02 | (2006.01) |
| F25B 9/14 | (2006.01) |
| G01J 1/02 | (2006.01) |

(52) U.S. Cl.
CPC ............... *F25B 9/02* (2013.01); *F25B 9/14* (2013.01); *G01J 1/0252* (2013.01)

(58) Field of Classification Search
CPC .......... F25B 9/02; F25B 9/14; F25B 2309/02; F25B 2309/00; F25B 2309/022
See application file for complete search history.

(56) References Cited

U.S. PATENT DOCUMENTS

| | | | | |
|---|---|---|---|---|
| 4,631,928 A | * | 12/1986 | Walker | F25B 9/02 137/614.11 |
| 5,003,783 A | * | 4/1991 | Reale | F25B 9/02 62/467 |
| 5,452,582 A | * | 9/1995 | Longsworth | A61B 18/02 606/24 |
| 5,913,889 A | * | 6/1999 | Buelow | F25B 9/02 62/222 |
| 6,070,414 A | | 6/2000 | Ross et al. | |
| 6,615,591 B1 | * | 9/2003 | Kusada | F25B 9/02 62/335 |
| 2012/0017607 A1 | | 1/2012 | Bin-Nun et al. | |

OTHER PUBLICATIONS

Notification of Transmittal of the International Search Report and the Written Opinion of the International Searching Authority dated Nov. 22, 2016 in connection with International Application No. PCT/US2016/047111, 11 pages.

\* cited by examiner

*Primary Examiner* — Brian King

(57) ABSTRACT

An apparatus includes a chamber, a first heat exchanger, an adapter, and a second heat exchanger. The first heat exchanger includes a cold finger positioned within the chamber. The second heat exchanger is positioned around an adapter and within the chamber. The second heat exchanger is a counter flow heat exchanger to precool refrigerant entering a Joule-Thomson valve. The adapter is positioned between the cold finger and the second heat exchanger. The adapter transfers heat from a thermal load to both the cold finger and the refrigerant emitted from the Joule-Thomson valve.

20 Claims, 4 Drawing Sheets

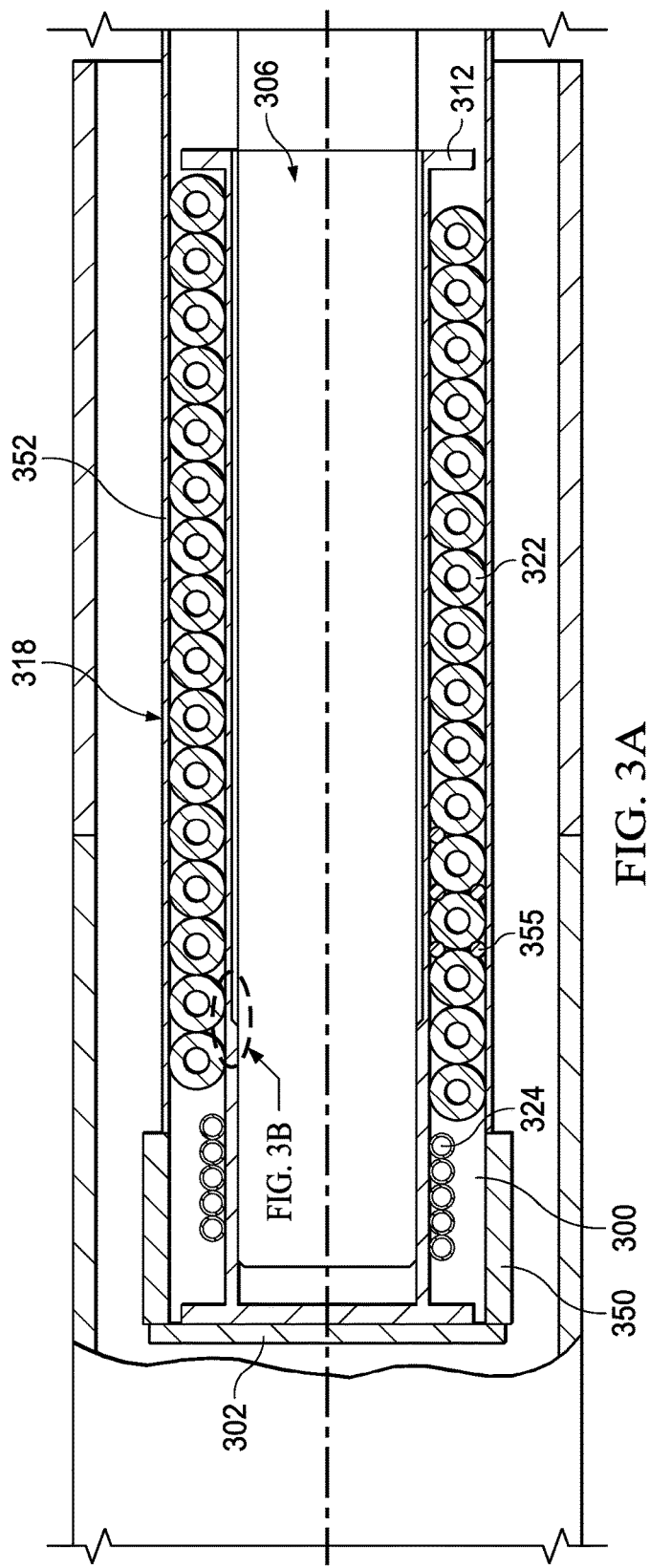
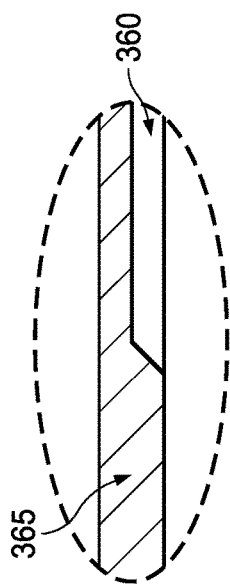
FIG. 3A
FIG. 3B

JOULE THOMSON AIDED STIRLING CYCLE COOLER

TECHNICAL FIELD

The present disclosure is directed cooling systems, and more particularly to a quick system ready with a long operating time cooling device.

BACKGROUND OF THE DISCLOSURE

Cryogenic coolers lift heat from infrared detectors and associated electronic and optical components in applications where space is limited. The cryogenic cooler is often inserted into a Dewar (or housing) onto which one or more detector elements are mounted. Current flight vehicle applications often require that an infrared focal plane array of detector elements be cooled to approximately liquid nitrogen temperatures, i.e., 77 K (−193° C.). Joule-Thomson and Stirling Cycle coolers are the two cooling technologies most often used to provide controlled cooling at such temperatures for size and weight critical applications.

A Joule-Thomson cooler is a device that produces liquid refrigerant by use of a valve (known in the art as a "Joule-Thomson valve") and counter flow heat exchanger. High-pressure gas is allowed to expand through the valve via an irreversible throttling process in which enthalpy is conserved, resulting in lowering of its temperature. The counter-flow heat exchanger transfers heat from the high-pressure incoming gas to the cooled exiting gas to decrease the enthalpy of the incoming gas and enable liquid production. The simplest form of a conventional Joule-Thomson cooler typically uses a fixed-size orifice near the heat exchanger at the cold end of the cooler such that cooling power is unregulated. The input pressure and internal gas flow dynamics establish the flow parameters of the refrigerant through the cooler.

Joule-Thomson coolers require a supply of highly pressurized gas. In certain applications, such as flight vehicles, this requirement tends to impose significant logistical constraints. In the flight vehicle context, for example, only a limited amount of pressurized gas can be carried on the flight vehicle and the host vehicle. This limits the operating time of the weapons platform in proportion to the amount of pressurized gas onboard. After each mission, the gas containers must be recharged. Extended use of Joule-Thomson coolers increases the possibility of contamination due to small impurities that may block the fine orifice of the device. These constraints impose significant field maintenance requirements that limit the viability of Joule-Thomson cryostats for such demanding applications.

Various improvements to the Joule-Thomson technology have been implemented to increase system operating time. These include various mechanisms to throttle back flow after cool down or systems that include a compressor instead of a gas bottle. Use of a compressor in place of a bottle can eliminate the need to recharge the gas container after each mission but comes with its own limitations and field maintenance requirements.

For these and other reasons, Stirling cycle coolers tend to be preferred for such applications as they can run for thousands of hours on electrical power alone. A Stirling cycle cooler is an efficient and compact closed-cycle, electrically-driven cryogenic cooling device using a repeating reversible expansion of a gas. It consists of two main assemblies, a compressor and a cold head. The compressor provides a sinusoidal pressure wave to the cold head. Modern cold heads typically consists of an expansion piston and integral regenerative heat exchanger. The regenerative heat exchanger (regenerator) is included in the expansion piston to thermally isolate gas at the compressor headspace from gas at the expansion headspace. Refrigeration is provided at one end of the cold finger portion of the cold head.

Stirling coolers are inherently slow to bring their thermal load to operating temperature but can run for long periods with only electrical power. Joule-Thomson coolers are much quicker to bring their load to operating temperature but require large amounts of size and weight to run for long periods. Various improvements to the Joule-Thomson technology have been implemented to increase system operating time but these systems do not approach the operating times of a Stirling system. The physics of a Stirling cooler do not allow it to match the refrigeration power and quick ready time of a Joule-Thomson system in any reasonable size limit. The system designer has had to choose between the two types of coolers and compromise vehicle performance as a result.

SUMMARY OF THE DISCLOSURE

In a first embodiment, an apparatus is provided that includes a chamber, a first heat exchanger, an adapter, and a second heat exchanger. The first heat exchanger includes a cold finger positioned within the chamber. The second heat exchanger is positioned around an adapter and within the chamber. The second heat exchanger is a counter flow heat exchanger to precool refrigerant entering a Joule-Thomson valve. The adapter is positioned between the cold finger and the second heat exchanger. The adapter transfers heat from a thermal load to both the cold finger and the refrigerant emitted from the Joule-Thomson valve.

In a second embodiment, a cooling system is provided for cooling a thermal load within a flight vehicle. The system comprises a bulkhead of the flight vehicle with a chamber. The system also comprises a first heat exchanger, an adapter, and a second heat exchanger. The first heat exchanger includes a cold finger positioned within the chamber. The second heat exchanger is positioned around an adapter and within the chamber. The second heat exchanger is a counter flow heat exchanger to precool refrigerant entering a Joule-Thomson valve. The adapter is positioned between the cold finger and the second heat exchanger. The adapter transfers heat from a thermal load to both the cold finger and the refrigerant emitted from the Joule-Thomson valve.

In a third embodiment, a method is provided for cooling an infrared detector device. The method includes activating a first heat exchanger. The first heat exchanger includes a cold finger portion of a cold head positioned within a chamber. An adapter is positioned around the cold finger. The method also includes, responsive to a determination to activate a second heat exchanger, activating the second heat exchanger with a high-pressure gas creating a refrigerant for Joule-Thomson expansion. The method also includes releasing, by a Joule-Thomson valve, the refrigerant into the chamber between the adapter and an inner wall of the chamber.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 3A and 3B illustrate a sectional side view of an illustrative implementation of a chamber in accordance with this disclosure;

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
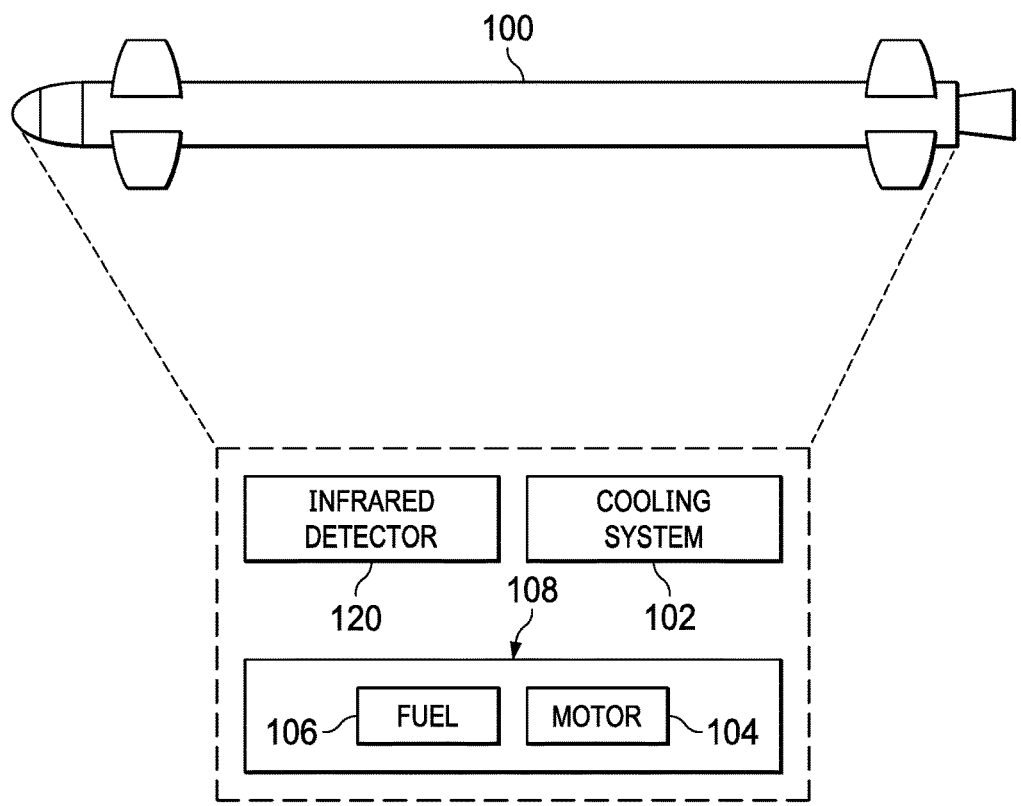
FIG. 1 illustrates an example flight vehicle having a cooling system in accordance with this disclosure.

FIG. 1 illustrates an example flight vehicle 100 having a cooling system 102 in accordance with this disclosure.

As shown in FIG. 1, the flight vehicle 100 includes a bulkhead 101. Within the bulkhead 101 are a motor 104, a fuel 106, and a motor casing 108. The motor 104 uses the fuel 106 to generate thrust for the flight vehicle 100. The motor 104 denotes any suitable structure for generating thrust for a flight vehicle, and the fuel 106 denotes any suitable fuel used by a motor for generating thrust for a flight vehicle. In some embodiments, the motor 104 represents a rocket motor, and the fuel 106 represents a solid rocket fuel. The motor casing 108 encases the motor 104 and the fuel 106, and fins or other structures are routinely mounted on the motor casing 108. The motor casing 108 is typically formed from metal or other structurally-reinforcing material(s).

In one or more embodiments, the flight vehicle 100 includes a cooling system 102 and an infrared (IR) detector 120. During operation, the IR detector 120 and its surrounding structure may have its temperature decreased to reduce its photon noise and background irradiance in order to improve the system sensitivity.

Although FIG. 1 illustrates one example of a flight vehicle 100 having a cooling system, various changes may be made to FIG. 1. For example, the cooling system 102 could be used with any other suitable flight vehicle or other system where cooling is needed or desired.

Various embodiments of this disclosure recognize and take into account that infrared (IR) detectors often need to be cooled to cryogenic temperatures to enable adequate system performance. Extended system operating times often dictate the use of Stirling cooler technology. However, Stirling coolers have limited refrigeration power and can take minutes to reach operating temperature from initial turn-on. The utility of a weapon or surveillance system for many applications would be greatly expanded if the system could reach operating temperature much quicker. Various embodiments of this disclosure provide a cooling system to enable very quick system ready times.

Various embodiments of this disclosure provide a cooling system that minimizes changes to the interfaces, primarily the detector Dewar assembly. The various embodiments provide operation of the Stirling cooler that can be quickly cooled for very quick ready times. The Stirling cooler would take over after cool down is achieved and normal Stirling operation would begin.

Various embodiments of this disclosure provide a Joule-Thomson cooler for quick ready times and a Stirling cooler for long run times. The various embodiments integrate the Joule-Thomson valve and counter-flow heat exchanger with the cold finger of the Stirling cooler to minimize size and steady-state heat load increases. Boiling of the Joule-Thomson produced liquid refrigerant and heat exchange between the Stirling cold finger and the cold platform occur through the same part, thus minimizing added thermal mass. Integration also takes advantage of lost refrigeration power from Joule-Thomson heat exchanger inefficiency to cool the compression side of the Stirling cold head to increase Stirling cooler performance.

Figure 2:
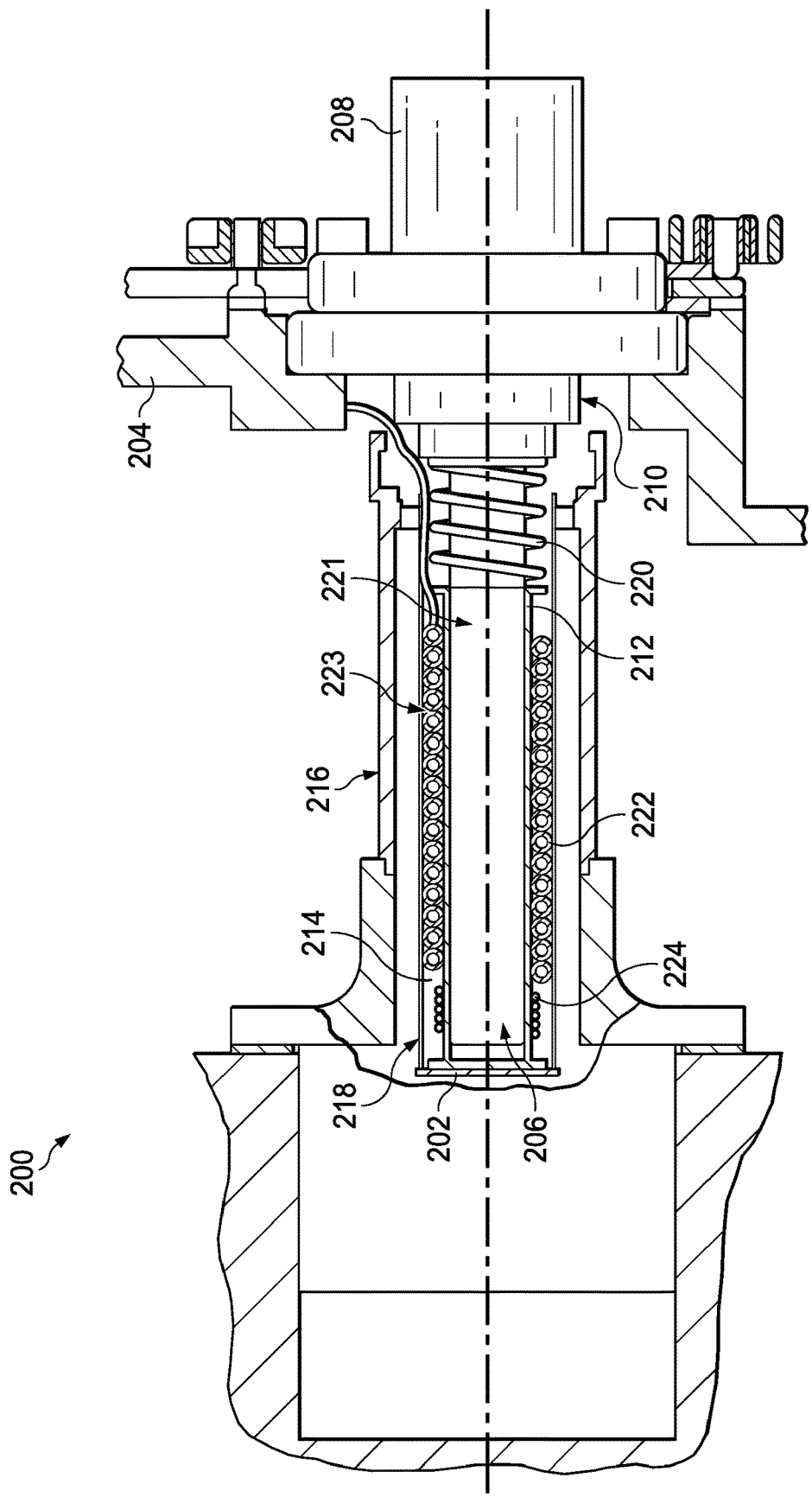
FIG. 2 illustrates a sectional side view of an illustrative implementation of a cooling system in accordance with this disclosure.

FIG. 2 illustrates a sectional side view of an illustrative implementation of a cooling system 200 in accordance with this disclosure. The cooling system 200 can be one example of cooling system 102 as shown in FIG. 1.

In FIG. 2, the cooling system 200 is shown with a platform 202 to which a thermal load can be attached thereto. In an illustrative flight vehicle application, the cooling system 200 is mounted within a support structure such as a bulkhead 204. The bulkhead 204 may be made of aluminum or other suitable material. A cold finger 206 is secured into the warm end of the cold head 208. The cold head 208 and cold finger 206 may be made of any suitable material such as titanium, a nickel-based super alloy or stainless steel.

The distal end of the cold finger 206 is slip fitted within an adapter 212 that is seated within a chamber 214. The chamber 214 can be housed in a vacuum flask, such as, for example, a Dewar. The outer wall of the chamber 214 may be made of titanium or other suitable material. As shown, the chamber 214 outer wall 218 forms the Dewar inner wall and is contained in the Dewar outer wall 216. The platform 202 for mounting the thermal load forms the end cap of the chamber 214. The chamber 214 is open at the proximal end of the cold finger 206.

The adapter 212 is pressed against an end cap of the chamber 214 by a coiled spring 220. The coiled spring 220 or equivalent, such as a material with a spring like quality or foam, acts against and transmits an axial spring force to the adapter 212 ensuring good thermal contact while minimizing parasitic thermal loads. The coiled spring 220 rests against the annular shoulders 210 of the cold head 208.

In one or more embodiments, the cold finger 206 can be part of a heat exchanger 221. The heat exchanger could be, for example, a Stirling cooler. The adapter 212 is configured to transfer heat away from the platform 202. The cold finger 206 may transfer heat from the thermal load through the adapter 212. The refrigerant exiting the J-T valve 224 may transfer heat from the thermal load though the adapter 212. The adapter 212 can transfer heat through conductivity.

In one or more embodiments, finned tubes 222 of a heat exchanger 223 are positioned within the chamber 214. The finned tubes 222 can be part of Hampson style heat exchanger which is part of a Joule-Thomson cooler. In an embodiment, the finned tubes 222 are formed in a spiral formation around the adapter 212. In another embodiment, other heat exchanger types can be used. In an embodiment, a J-T valve 224 consisting of a small diameter capillary tube formed in a spiral formation around the adapter 212 resides at the end of the finned tube 222. In another embodiment, other methods of throttling the high pressure gas in an isenthalpic manner can be used. The valve 224 allows the release of a refrigerant to flow from the inner portion of the finned tube 222 into the chamber 214. In one embodiment, the refrigerant from the J-T valve 224 provides a faster cooling rate than the cold finger 206 when the cold head 206 is initially activated.

Although FIG. 2 illustrates one example of a cooling system 200, various changes may be made to FIG. 2. For example, the cooling system 200 could be used with any other system where cooling is needed or desired. Also, the makeup and arrangement of the cooling system 200 in FIG. 2 is for illustration only. Components could be added, omitted, combined, or placed in any other suitable configuration according to particular needs.

FIGS. 3A and 3B illustrate a sectional side view of an illustrative implementation of a chamber 300 in accordance with this disclosure. The chamber 300 can be one example of the chamber 214 as shown in FIG. 2.

In FIGS. 3A and 3B, the chamber 300 is shown with a platform 302 for mounting a thermal load attached thereto. In an illustrative flight vehicle application, the chamber 300 is mounted within a support structure such as a bulkhead. The chamber 300 includes a cold finger 306, an adapter 312, an outer wall 318, finned tubes 322, and J-T valve 324.

The distal end of the cold head 306 is slip fitted within an adapter 312 that is seated within a chamber 300. The chamber 300 can be contained in a vacuum flask, such as, for example, a dewar. The chamber 300 may be made of titanium or other suitable material. The platform 302 for mounting the thermal load forms the end cap of the chamber 300. The chamber 300 is open as the proximal end of the cold finger 306.

In one embodiment of this disclosure, the outer wall 318 of the chamber 300 includes a thick portion 350 and a thin portion 352. The thin portion 352 allows for minimal thermal conduction while the thick portion 350 allows for increased thermal conduction. In this embodiment, the J-T valve 324 are near the thick portion 350 allowing the refrigerant to primarily contact the thick portion 350 and increase thermal conduction to the platform 302. In various embodiments, other features such as fin-like structures could also be added to aid boiling heat transfer. In various embodiments, a thread shaped gasketing material is spirally wound with the heat exchanger tube 322 to improve heat exchanger efficiency, as is customary.

In one or more embodiments, there may be additional layers, or other materials between the adapter 312 and the platform 302. In some embodiments, a gap 360 exists between the adapter 312 and cold finger 306 to minimize thermal conduction between the heat exchanger and the cold finger 306. Near the distal end of the cold finger 306, the gap 360 can decrease and allow for a tight fit between the adapter 312 and cold finger 306 at portion 365 to provide thermal contact between the adapter 312 and the cold finger 306 at the coldest portion of the Stirling cold head.

In one or more embodiments, the cold finger 306 can be part of a heat exchanger. The heat exchanger could be, for example, a Stirling cooler. The cold finger 306 is configured to transfer heat away from the platform 302. The cold finger 306 may transfer heat from the thermal load through the adapter 312. The refrigerant exiting the J-T valve 324 may transfer heat from the thermal load through the adapter 312 or the enhanced portion of the outer wall 318. The adapter 312 can transfer heat through conductivity. The adapter 312 is configured to provide a thermal path between the thermal load and the Stirling cold finger 306 as well as a path between the thermal load and the refrigerant exiting the J-T valve 324.

Although FIGS. 3A and 3B illustrate one example of a chamber 300, various changes may be made to FIGS. 3A and 3B. For example, the chamber 300 could be used with any other system where cooling is needed or desired. Also, the makeup and arrangement of the chamber 300 in FIGS. 3A and 3B is for illustration only. Components could be added, omitted, combined, or placed in any other suitable configuration according to particular needs.

Figure 4:
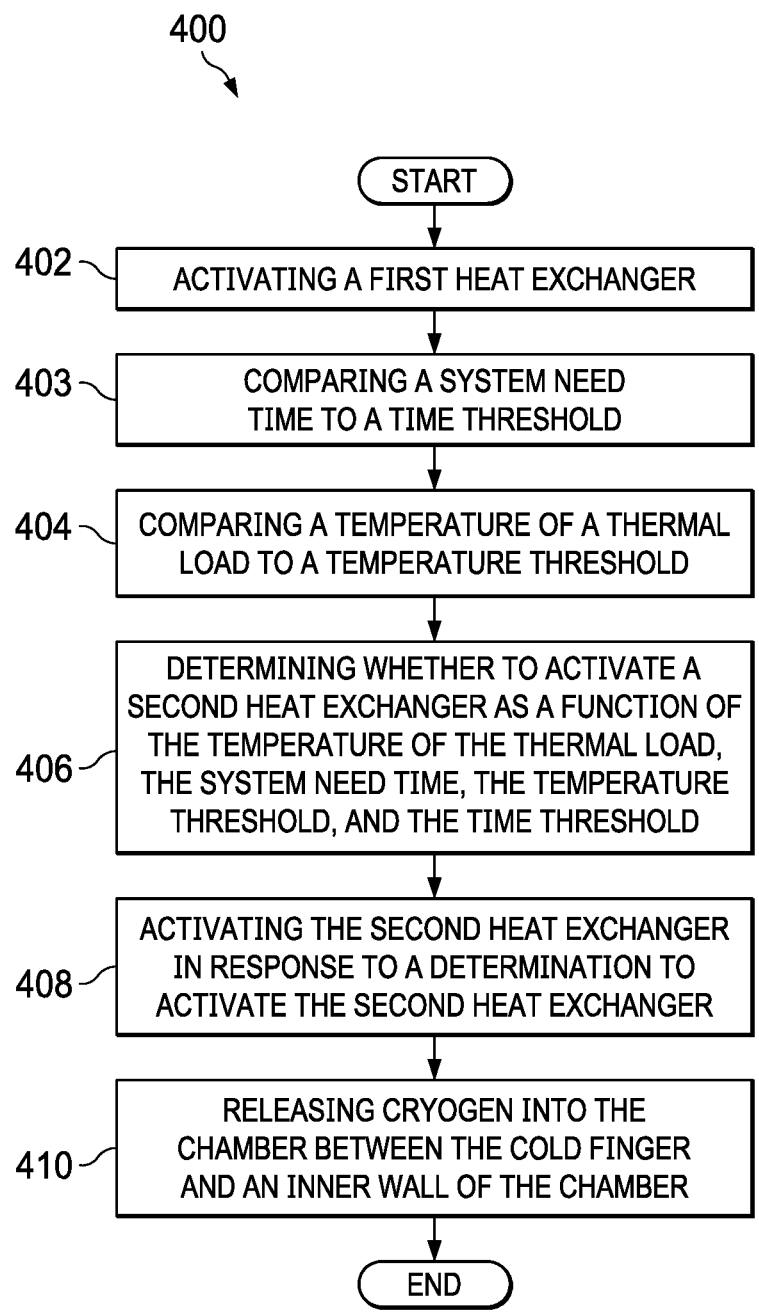
FIG. 4 illustrates a process for cooling a thermal load in accordance with this disclosure.

FIG. 4 illustrates a process 400 for cooling a thermal load in accordance with this disclosure. The process 400 can be implemented by the cooling system 200 as shown in FIG. 2. A processor can execute a set of instructions to perform the process 400.

In FIG. 4, a processor is configured to, at 402, activate a first heat exchanger. The first heat exchanger can be a closed-cycle, electrically-driven cryogenic cooling device, such as, but not limited to a Stirling cooler. The first heat exchanger can include a cold head positioned within a chamber.

At 403, the processor is configured to compare the estimated system need time to a time threshold. The estimated system need time can be determined from data pertinent to system operation and timeline. The time threshold can be predetermined.

At 404, the processor is configured to compare a temperature of a thermal load to a temperature threshold. A sensor can measure the temperature of the thermal load in the cooling system. The temperature threshold can be predetermined.

At 406, the processor is configured to determine whether to activate a second heat exchanger as a function of system need time, the temperature of the thermal load, and the predetermined time/temperature thresholds. In one example, if the system need time is imminent and if the temperature of the thermal load is greater than the temperature threshold, then the second heat exchanger can be activated because the thermal load is at such a temperature that additional cooling at the activation of the first heat exchanger is desired to meet system timing needs.

At 408, the processor is configured to activate the second heat exchanger in response to a determination to activate the second heat exchanger. At 410, the second heat exchanger releases refrigerant into the chamber between the cold head and the inner wall of the chamber. The refrigerant quickly cools the thermal load prior to a full initialization of the first heat exchanger.

Although FIG. 4 illustrates one example of a process 400, various changes may be made to FIG. 4. For example, the second heat exchanger may be activated based on the system need time only. In another embodiment, the second heat exchanger may always be activated when the first heat exchanger is activated. In other embodiments, the second heat exchanger may be activated before the first heat exchanger.

Figure 5:
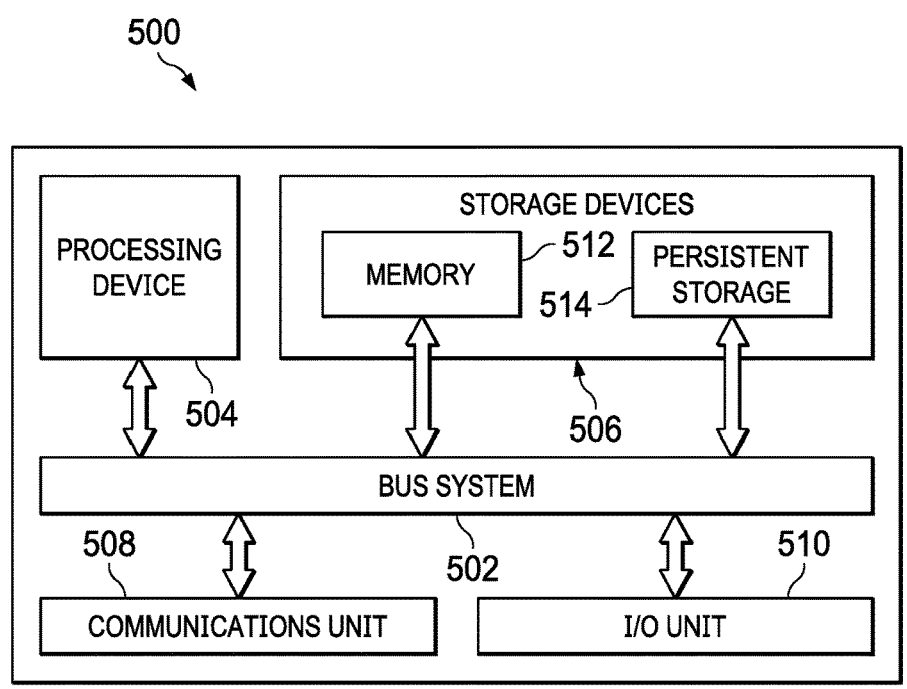
FIG. 5 illustrates an example computer that may be used for controlling a cooling system according to this disclosure.

FIG. 5 illustrates an example computer 500 that may be used for controlling a cooling system according to this disclosure. As shown in FIG. 5, the device 500 includes a bus system 502, which supports communication between at least one processing device 504, at least one storage device 506, at least one communications unit 508, and at least one input/output (I/O) unit 510.

The processing device 504 executes instructions that may be loaded into a memory 512. The processing device 504 may include any suitable number(s) and type(s) of processors or other devices in any suitable arrangement. Example types of processing devices 504 include microprocessors, microcontrollers, digital signal processors, field programmable gate arrays, application specific integrated circuits, and discrete circuitry.

The memory 512 and a persistent storage 514 are examples of storage devices 506, which represent any structure(s) capable of storing and facilitating retrieval of information (such as data, program code, and/or other suitable information on a temporary or permanent basis). The memory 512 may represent a random access memory or any other suitable volatile or non-volatile storage device(s). The persistent storage 514 may contain one or more components or devices supporting longer-term storage of data, such as a ready only memory, hard drive, Flash memory, or optical disc.

The communications unit 508 supports communications with other systems or devices. For example, the communications unit 508 could include a network interface card that facilitates communications over at least one Ethernet network. The communications unit 508 could also include a wireless transceiver facilitating communications over at least one wireless network. The communications unit 508 may support communications through any suitable physical or wireless communication link(s).

The I/O unit 510 allows for input and output of data. For example, the I/O unit 510 may provide a connection for user input through a keyboard, mouse, keypad, touchscreen, or other suitable input device. The I/O unit 510 may also send output to a display, printer, or other suitable output device.

Although FIGS. 1 through 3B illustrate example cooling systems, various changes may be made to FIGS. 1 through 3B. For example, it will be understood that well-known processes have not been described in detail and have been omitted for brevity. Although specific steps, structures and materials may have been described, this disclosure may not be limited to these specifics, and others may be substituted as it is well understood by those skilled in the art, and various steps may not necessarily be performed in the sequences shown.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. An apparatus comprising:
    a chamber;
    a first heat exchanger including a cold finger, wherein the cold finger is positioned within the chamber;
    a second heat exchanger positioned within the chamber, wherein the second heat exchanger is a counter flow heat exchanger configured to precool refrigerant entering a Joule-Thomson valve; and
    an adapter comprising a conductive metal and positioned between the cold finger and the second heat exchanger, the adapter configured to transfer heat from a thermal load to both the cold finger and the refrigerant emitted from the Joule-Thomson valve, wherein the adapter is formed around a portion of the cold finger, and wherein the second heat exchanger is positioned around the adapter.

2. The apparatus of claim 1, wherein a portion of an inner wall of the chamber is configured to transfer the heat from the thermal load to the refrigerant.

3. The apparatus of claim 1, wherein the adapter is pressed against an end cap of the chamber by a string.

4. The apparatus of claim 1, wherein the adapter is configured to transfer the heat conductively.

5. The apparatus of claim 1, wherein the second heat exchanger is a recuperative heat exchanger.

6. The apparatus of claim 5, wherein the second heat exchanger includes at least one orifice configured to release the refrigerant within the chamber, and wherein the orifice is positioned near the thermal load.

7. The apparatus of claim 1, wherein the thermal load is an infrared detector.

8. The apparatus of claim 1, further comprising:
    a memory element configured to store a set of instructions; and
    a processor coupled to the memory element and configured, when executing the set of instructions, to:
        responsive to a determination to activate the second heat exchanger, activate the second heat exchanger to release the refrigerant into the chamber.

9. The apparatus of Claim 8, wherein the processor is further configured, when executing the set of instructions, to:
    compare a system need time to a time threshold;
    compare a temperature of the thermal load to a temperature threshold; and
    determine whether to activate the second heat exchanger as a function of the system need time, the temperature, the time threshold, and the temperature threshold.

10. The apparatus of claim 1, further comprising:
the Joule-Thomson valve configured to emit the refrigerant.

11. A cooling system for cooling a thermal load within a flight vehicle, the system comprising:
a chamber within a bulkhead of the flight vehicle;
a first heat exchanger including a cold finger, wherein the cold finger is positioned within the chamber;
a second heat exchanger positioned within the chamber, wherein the second heat exchanger is a counter flow heat exchanger configured to precool refrigerant entering a Joule-Thomson valve; and
an adapter comprising a conductive metal and positioned between the cold finger and the second heat exchanger, the adapter configured to transfer heat from a thermal load to both the cold finger and the refrigerant emitted from the Joule-Thomson valve, wherein the adapter is formed around a portion of the cold finger, and wherein the second heat exchanger is positioned around the adapter.

12. The cooling system of claim 11, wherein the adapter is pressed against an end cap of the chamber by a spring.

13. The cooling system of claim 11, wherein the adapter is configured to transfer the heat conductively.

14. The cooling system of claim 11, wherein the second heat exchanger is a recuperative heat exchanger.

15. The cooling system of claim 14, wherein the second heat exchanger includes at least one orifice configured to release the refrigerant within the chamber, and wherein the orifice is positioned near the thermal load.

16. The cooling system of claim 11, wherein the thermal load is an infrared detector.

17. The cooling system of claim 11, further comprising:
a memory element configured to store a set of instructions; and
a processor coupled to the memory element and configured, when executing the set of instructions, to:
responsive to a determination to activate the second heat exchanger, activate the second heat exchanger to release the refrigerant into the chamber.

18. The cooling system of claim 17, wherein the processor is further configured, when executing the set of instructions, to:
compare a system need time to a time threshold;
compare a temperature of the thermal load to a temperature threshold; and
determine whether to activate the second heat exchanger as a function of the system need time, the temperature, the time threshold, and the temperature threshold.

19. A method for cooling a thermal load, the method comprising:
activating a first heat exchanger, wherein the first heat exchanger includes a cold finger portion of a cold head positioned within a chamber, wherein an adapter comprising a conductive metal is positioned around a portion of the cold finger, and wherein a second heat exchanger is positioned around the adapter;
responsive to a determination to activate the second heat exchanger, activating the second heat exchanger with a high-pressure gas creating a refrigerant for Joule-Thomson expansion; and
releasing, by a Joule-Thomson valve, the refrigerant into the chamber between the adapter and an inner wall of the chamber.

20. The method of claim 19, further comprising:
compare a system need time to a time threshold;
compare a temperature of the thermal load to a temperature threshold; and
determine whether to activate the second heat exchanger as a function of the system need time, the temperature, the time threshold, and the temperature threshold.

* * * * *